United States Patent [19]
Adler

[11] 3,726,019
[45] Apr. 10, 1973

[54] REMOTE CONTROLLED DRAWING DEVICE

[76] Inventor: Ronald E. Adler, 1410 35th Street N.W., Washington, D.C. 20007

[22] Filed: Aug. 25, 1970

[21] Appl. No.: 66,666

[52] U.S. Cl. ................................................. 33/18 R
[51] Int. Cl. .............................................. B43l 13/00
[58] Field of Search ........................... 33/18 R, 23 C; 46/210, 244 R, 244 A

[56] References Cited

UNITED STATES PATENTS

| | | | |
|---|---|---|---|
| 3,002,280 | 10/1961 | Bennett | 33/27 C |
| 2,751,273 | 6/1956 | Rankin | 33/18 R |
| 3,232,005 | 2/1966 | Lahr | 46/244 R |

FOREIGN PATENTS OR APPLICATIONS

| | | | |
|---|---|---|---|
| 723,043 | 7/1942 | Germany | 46/210 |
| 1,200,175 | 6/1959 | France | 46/244 R |
| 1,247,474 | 10/1959 | France | 46/210 |

*Primary Examiner*—Harry N. Haroian
*Attorney*—Natter, Wigman & Natter

[57] ABSTRACT

This disclosure relates to a drawing device comprising a three wheel power driven vehicle which carries a marking pen adapted to trace lines on a paper as the vehicle is driven thereover. Remote controls permit the operator to steer the vehicle as well as drive it forward and in reverse to draw selected patterns and pictures on the paper.

4 Claims, 7 Drawing Figures

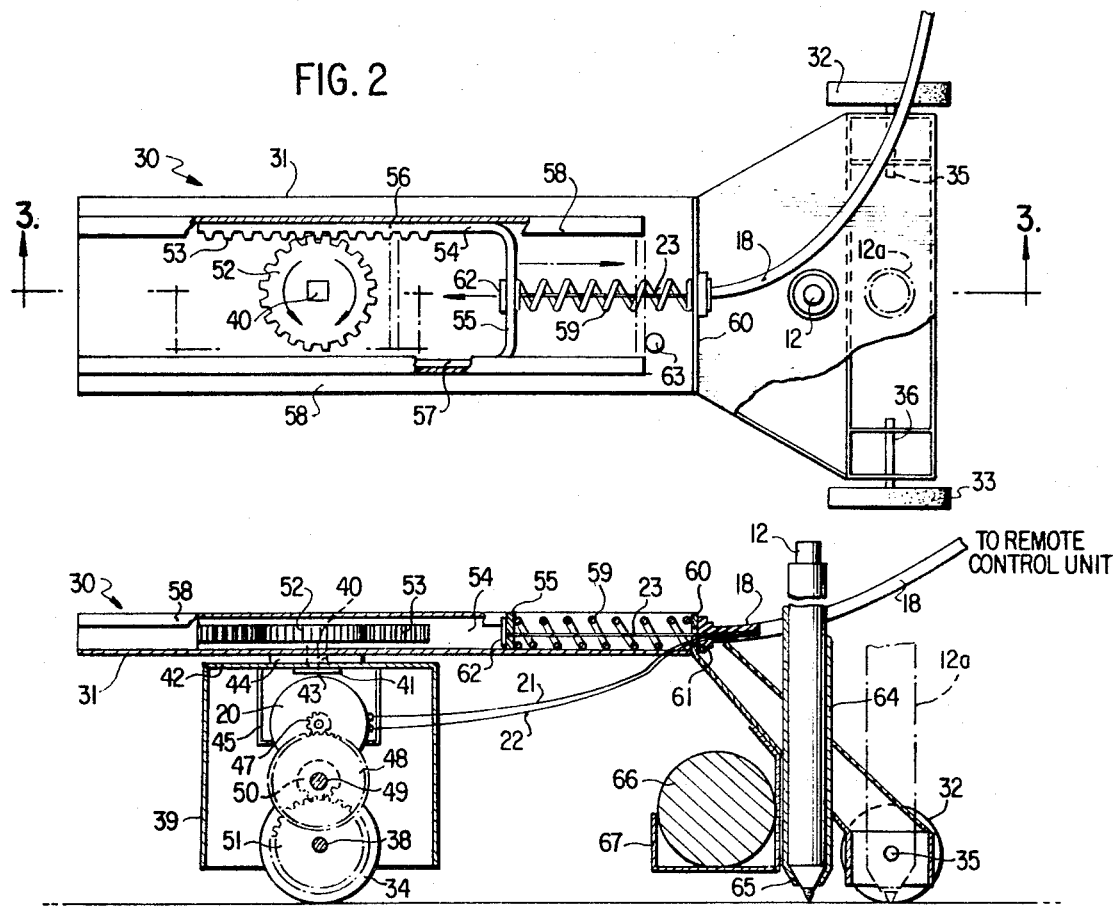
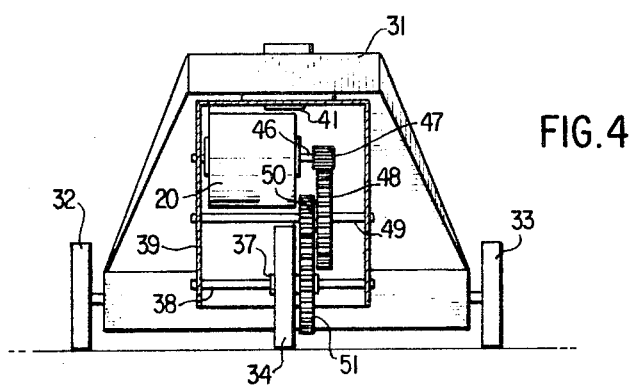

INVENTOR
RONALD E. ADLER

BY Natter, Wigman & Natter

ATTORNEYS

REMOTE CONTROLLED DRAWING DEVICE

This invention relates generally to the graphic arts, and more particularly to a power driven vehicle which carries a marking pen adapted to trace lines on a paper as the vehicle is driven thereover. The vehicle can be remotely steered to right and left, forward and in reverse to draw selected lines on the paper.

The drawing device is basically intended as a toy with which children may draw pictures on sheets of paper. By controlling the vehicle to draw pictures by remote control, a child can learn coordination, motor skills, foresightedness, dexterity and spatial relations.

To enhance the visual appeal of the drawing device to young children, the chassis of the vehicle is preferably covered with a shell housing in the form of an animate object such as a ladybug shown in the preferred embodiment of the invention disclosed herein. The shell is formed with a hole in its top through which the marking pen may be inserted and withdrawn. It is contemplated that the drawing device will be provided with a plurality of differently colored pens from which the child may selectively choose to draw multi-colored pictures.

Basic to the concept of the drawing device is the construction of the vehicle with a three wheel chassis including two idle wheels and a single driven wheel defining a typical tricycle design. By providing direct steering control of the single driven wheel and by locating the marking pen close to and spaced equidistantly between the two idle wheels, ink lines of very small radii may be obtained. It is, of course, highly desirable that the drawing device be capable of defining sharp corners so that it will be feasible to draw pictures having relatively well defined details.

The drawing device may be used to define freehand-type pictures as well as in drawing-games provided on pre-printed sheets of paper. For example, lines may be connected between pre-numbered dots which define a picture. Other games such as steering the vehicle through a maze while attempting to prevent the ink line defined by the marking pen from touching the boundary lines are also contemplated.

It is, therefore, an object of this invention to provide a device for drawing pictures on a surface by remote control.

More particularly, it is an object of this invention to provide a remote controlled vehicle which carries a marking pen adapted to trace lines on a paper as the vehicle is driven thereover.

Another object of this invention is to provide a remote controlled drawing device comprising a vehicle having a three wheel chassis including two idle wheels and one driven wheel, and wherein rack and pinion means are provided for selectively steering the driven wheel.

A further object of this invention is to provide a drawing device comprising a vehicle that can be remotely steered to right and left, forward and in reverse, to selectively draw sweeping curves, straight lines and sharp corners.

Still another object of this invention is to provide a device for drawing pictures by remote control whereby a child can learn coordination, motor skills, foresightedness, dexterity and spatial relations.

With the above and other objects in view that will hereinafter appear, the nature of the invention will be more clearly understood by reference to the following detailed description, the appended claimed subject matter and the several views illustrated in the accompanying drawings:

In the Drawings:

FIG. 2 is a plan view of the chassis of the device having parts thereof cut away to illustrate the rack and pinion steering arrangement.

FIG. 3 is a longitudinal sectional view taken along line 3—3 of FIG. 2 and illustrates the bogie or swivelled housing which supports the drive motor and gear reduction train, as well as illustrates the marking pen and its retaining sleeve;

FIG. 4 is a front end view of the chassis of the drawing device having the front portion of the bogie cut away to more clearly show the drive motor and gear train connection to the single drive wheel;

Figure 5A:
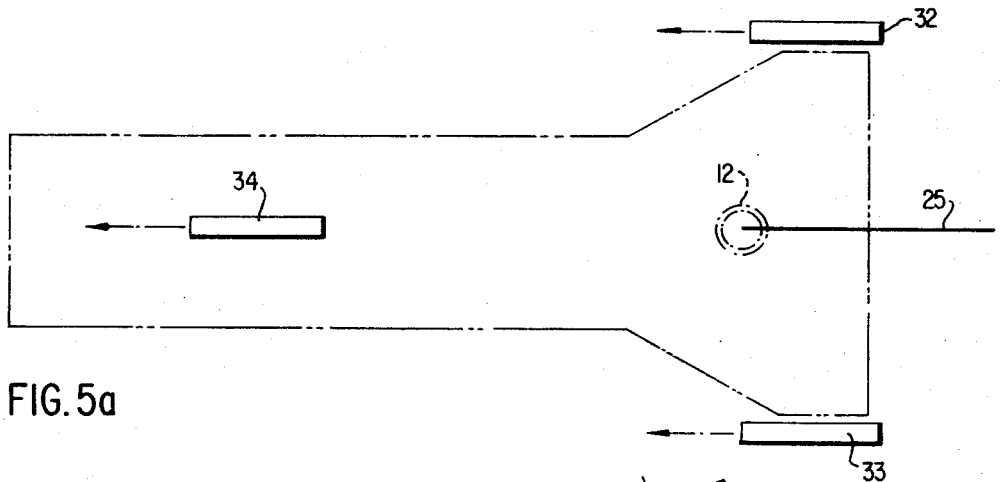
Figure 5B:
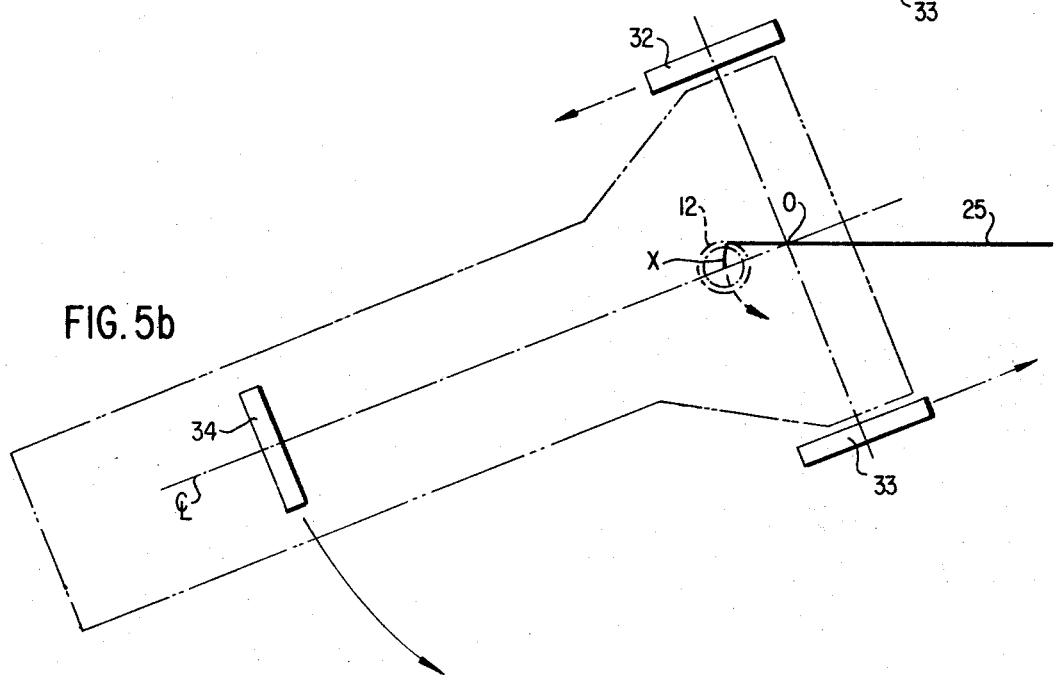
Figure 6:
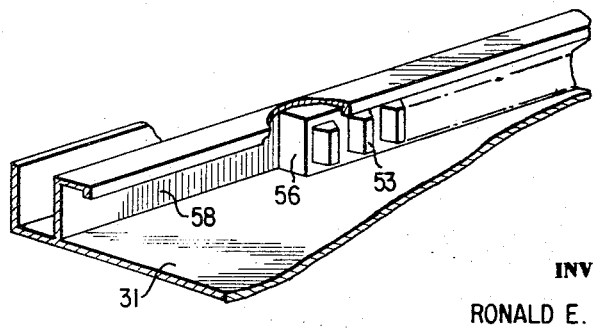

FIGS. 5a and 5b are schematic views illustrating, respectively, the lines drawn by the marking pen with the driven wheel pointed straight ahead, and with the wheel turned 90 degrees to the left of the longitudinal centerline, and FIG. 6 is an enlarged partial perspective view, having portions thereof cut away, of the rack portion of the steering arrangement and its guide channel formed in the chassis frame.

Figure 1:
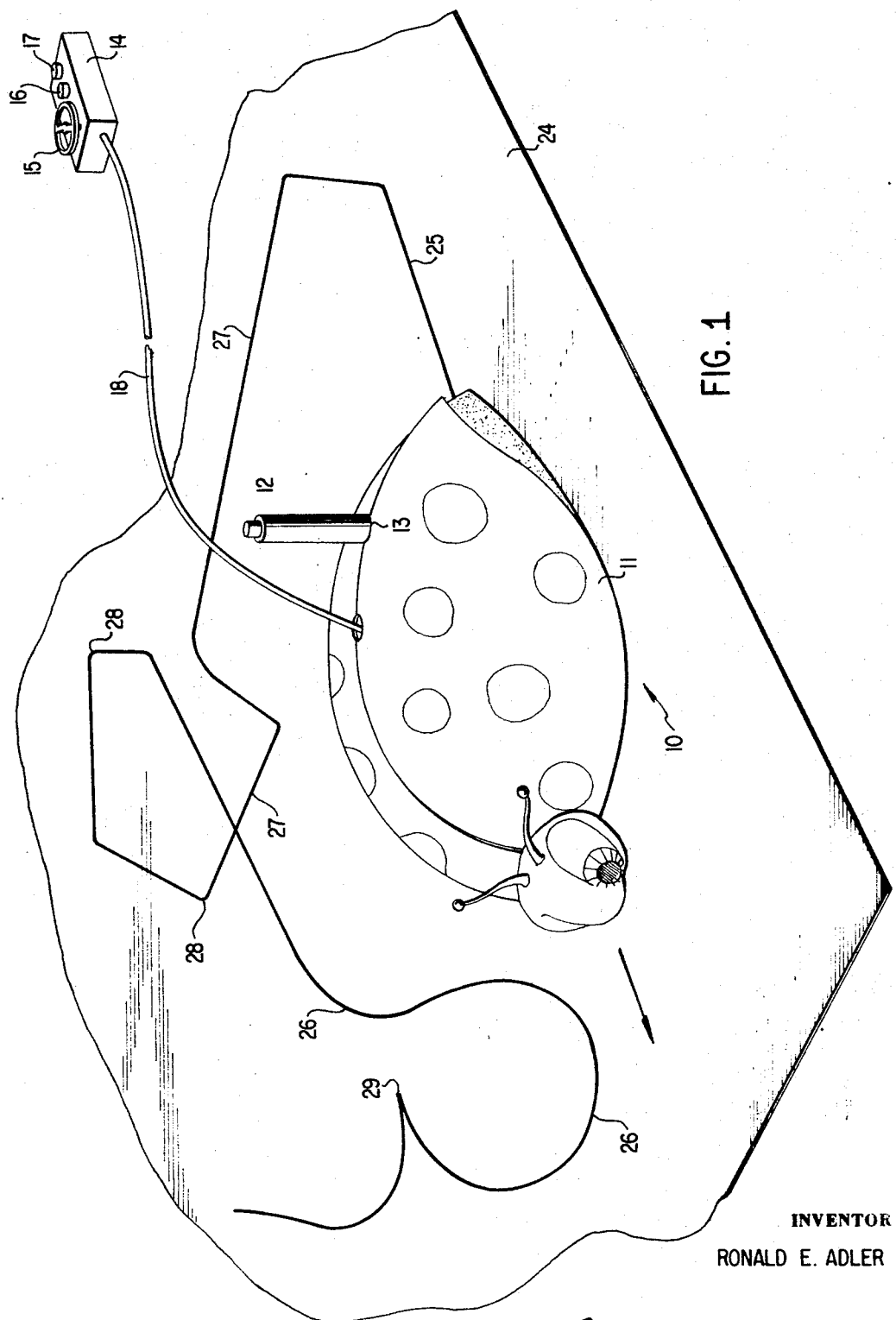
FIG. 1 is a perspective view of the remote controlled drawing device, including a ladybug-type outer shell, disposed on a sheet of paper, and illustrates sweeping curves, straight lines and sharp corners drawn by the device.

Referring now to the drawings in detail, there is illustrated in FIG. 1 a remote controlled drawing device designated generally by the numeral 10. The drawing device 10 is preferably covered by a shell housing 11 which may take the form of a ladybug or other animate object having visual appeal to children. The drawing device 10 carries a marking pen 12 which is inserted through an opening 13 in the top of the housing 11.

Operation of the drawing device 10 is controlled by a remote control unit 14 which includes steering control means 15 and forward and reverse buttons 16 and 17. The control unit 14 is connected to the drawing device 10 by means of a flexible sheath 18 which passes through an opening 19 in the housing 11. Batteries (not shown) in the control unit 14 are connected to a small D.C. motor 20 (FIG. 3) by means of electrical leads 21, 22 which pass through the sheath 18. A Bowden wire type pull cable 23 also passing through the sheath 18 is activated by the control means 15 to steer the drawing device 10 in a manner to be hereinafter explained.

Referring once again to FIG. 1, it can be seen that the drawing device 10 is situated on a sheet of paper 24 upon which is inscribed a continuous ink line 25 traced by the marking pen 12 over the path in which the drawing device 10 has been driven. It can be seen that the drawing device 10 has inscribed sweeping curves 26, straight lines 27 and sharp corners 28. A transitional point 29 in the line 25 indicates the position of the drawing device 10 when the drive was changed from reverse to forward.

As seen most clearly in FIGS. 2, 3 and 4, the drawing device 10 includes a chassis 30 having a frame 31 upon which are mounted two rear idle wheels 32, 33 and a forward driven wheel 34. The rear idle wheels 32, 33 are supported on suitably journalled stub axles 35 and 36. The forward driven wheel 34 is journalled by means of a rotatable sleeve 37 (FIG. 4) on an axle 38 which is supported at both ends by a swivelled housing or bogie 39 which depends from and is pivotally secured to the frame 31 by means of a square shaft 40 having a flat support head 41. The bogie 39 includes an upper portion 42 having a square hole 43 formed therein through which the square shaft 40 extends and coacts to transmit rotary torque to the bogie 39 for steering the wheel 34 in a manner to be hereinafter described. A washer 44 positioned between the upper portion 42 of the bogie 39 and the underside of the frame 31 serves as a bearing surface for the turning movements of the bogie 39 and provides stability thereto.

The motor 20 is supported in the bogie 39 by means of a support bracket 45 which depends from and is suitably secured to the upper portion 42. The motor 20 includes an output shaft 46 upon which is mounted a drive pinion 47. The pinion 47 is meshed with and in turn drives a gear 48 which is mounted on a shaft 49 supported by the bogie 39. Also mounted on the shaft 49 is a pinion 50 which is meshed with and in turn drives a gear 51 which is mounted on the sleeve 37 and thus drives the wheel 34. It should be apparent, therefore, that the speed of the motor 20 is appreciably reduced through the gear train 47–51, preferably in the order of a ratio of 100 to 1, whereby the drawing device 10 will be driven at a rate of approximately 1.2 inches per second, a speed sufficiently slow to permit a high degree of control such as to make drawing pictures possible.

Turning now to the mechanism for turning the bogie 39 whereby the drawing device 10 can be steered right and left, it can be seen in FIGS. 2 and 3 that a gear wheel or pinion 52 is suitably secured to the upper end of the square shaft 40. The pinion 52 is adapted to mesh with gear teeth 53 formed in a U-shaped rack 54. The rack 54 includes a bight portion 55 and two legs 56 and 57. The gear teeth 53 are formed only in the leg 56. The rack 54 is adapted to slide along the frame 31 with its legs 56, 57 received in and guided by upstanding L-shaped channels 58 as seen most clearly in FIG. 6. It should be thus apparent that translation of the rack 54 will cause rotation of the pinion 52 thereby causing turning of the bogie 39 and wheel 34.

The rack 54 is constantly biased to the left (as viewed in FIGS. 2 and 3) by a coil spring 59 having one end abutting the bight portion 55 of the rack 54 and its other end abutting an upstanding flange 60 formed in the frame 31. The flange 60 serves as an anchoring point for the end of the sheath 18 which is suitably secured thereto. The rack 54 may be moved to the right against the force of the spring 59 by the pull cable 23 which extends from the end of the sheath 18 through a hole 61 in the flange 60, through the coils of the spring 59 and then through the bight portion 55 of the rack 54 where it is secured by a suitable enlarged head 62. It should be thus apparent that when the rack 54 is in its extreme left and right positions as indicated by the dotted lines in FIG. 2, the wheel 34 will be steered for a maximum left and right turn, respectively. Suitable stops for the rack 54 may be provided such as shown at 63 for limiting turning of the wheel 34 to 90 degrees in either direction from the longitudinal centerline of the chassis 30. Turns of more than 90 degrees have been found to be undesirable that they threaten tipping of the drawing device 10 as well as lead to erratic ink marks due to skidding of the idle wheels 32, 33.

Conventional means, well known to those skilled in the art, responsive to actuation of the steering control means 15 may be provided in the control unit 14 for pulling the cable 23 against the force of the spring 59. Inasmuch as the spring 59 constantly biases the rack 54 toward its extreme leftmost position, the rest position of the wheel 34 is 90° to the left of the longitudinal centerline. It is apparent, therefore, that manipulation of the cable 23 can position the wheel 34 at any selected point along an azimuth of 180° from its rest position to a position of 90° to the right of the centerline.

The frame 31 also carries a tubular guide 64 into which the pen 12 is inserted. The guide 64, which communicates with the opening 13 in the shell 11 in the assembled condition of the drawing device 10, includes a tapered lower portion 65 which abuts a correspondingly tapered portion of the pen 12 to retain the pen 12 in the guide 64 in the event the drawing device 10 is lifted from the paper. The point of the pen, of course, extends through an opening in the bottom of the guide 64 to engage the paper. The weight of the pen 12 itself is sufficient to produce an adequate ink mark on the paper. The pen 12 preferably has a porous felt tip. It is contemplated, however, that other type pens as well as other type marking means may be utilized within the scope of the invention.

The weight of the motor 20 situated above the drive wheel 34 results in sufficient friction of the drive wheel 34 on the paper to assure positive drive without slippage. However, a weight 66 supported by a bracket 67 near the rear of the chassis 30 is preferably added to assure proper tracking of the idle wheels 32, 33 without skidding. In an alternate embodiment of the invention, the weight 66 may be replaced by a battery which would serve the dual functions of supplying current to the motor 20 and weight to the idle wheels 32, 33.

FIGS. 5a and 5b illustrate the trace of the ink line 25 as the drawing device 10 is driven first in a straight line and then through a turn of approximately 30° with the wheel 34 turned 90 degrees to the left of the longitudinal centerline. It can be seen that the curve X is of a relatively small radius. This is accomplished by positioning the pen 12 close to the axis of the rear idle wheels 32, 33. Inasmuch as the center of rotation of the drawing device 10 is located at 0 when the wheel 34 is turned 90° from the longitudinal centerline, all arcs described by points extending progressively from 0 outward along the centerline will be of increasing radii. In fact, positioning the pen directly at 0, as shown in phantom at 12a in FIGS. 2 and 3, will cause the drawing device 10 to walk around the pen 12a without tracing a line when the wheel 34 is turned 90°.

It should be thus apparent that by combining the drive and steering in a single wheel leaving the remaining two wheels free as idlers, and by positioning the marking pen close to the idle wheels, a drawing device is provided having extremely close control such that the drawing of pictures by remote control is feasible.

Although only a preferred embodiment of the invention has been specifically illustrated and described herein, it is to be understood that minor variations may be made without departing from the spirit of the invention.

I claim:

1. A toy for drawing pictures and the like comprising a remote controlled vehicle including a chassis covered by a simulated animate shell, marking means carried by said vehicle, means to drive said vehicle over a surface, means remote from said vehicle for selectively controlling said drive means and for steering said vehicle over the surface, means on said chassis for retaining said marking means in marking contact with the surface, an opening defined in said simulated animate shell and aligned with said retaining means for inserting or withdrawing said marking means therefrom, said chassis having a front driven wheel and two rear idle wheels, said driven wheel and said drive means mounted on a swivel housing carried by said chassis, and wherein said controlling means includes a rack and pinion means operatively connected to said swivel housing, and pull cable means operatively connected to said rack and pinion means for selectively steering said driven wheel, whereby lines may be selectively drawn on the surface by said marking means as said vehicle is driven thereover.

2. A remote controlled drawing device as defined in claim 1 wherein said retaining means is a tube carried by said chassis and having a tapered lower portion for receiving a correspondingly tapered portion of said marking means.

3. A remote controlled drawing device as defined in claim 1 wherein said marking means extends through said shell when operatively received in said drawing device.

4. A remote controlled drawing device as defined in claim 1 wherein said marking means is spaced substantially equidistantly between said idle wheels but offset from the axis of said wheels.

* * * * *